(12) United States Patent
Nikolaidis et al.

(10) Patent No.: US 12,486,410 B2
(45) Date of Patent: Dec. 2, 2025

(54) NOBLE METAL COATINGS WITH CONTROLLED MORPHOLOGY

(71) Applicant: Heraeus Deutschland Gmbh & Co. KG, Hanau (DE)

(72) Inventors: Ilias Nikolaidis, Hanau (DE); Robert Sievi, Hanau (DE)

(73) Assignee: Heraeus Medevio GmbH & Co. KG, Hanau (DE)

( * ) Notice: Subject to any disclaimer, the term of this patent is extended or adjusted under 35 U.S.C. 154(b) by 572 days.

(21) Appl. No.: 18/057,556

(22) Filed: Nov. 21, 2022

(65) Prior Publication Data

US 2023/0235185 A1 Jul. 27, 2023

(30) Foreign Application Priority Data

Nov. 26, 2021 (DE) .......................... 102021213364.9

(51) Int. Cl.
*C09D 5/24* (2006.01)
*C09D 7/20* (2018.01)
*C09D 7/63* (2018.01)

(52) U.S. Cl.
CPC .................. *C09D 5/24* (2013.01); *C09D 7/20* (2018.01); *C09D 7/63* (2018.01)

(58) Field of Classification Search
CPC ............... C09D 5/24; C09D 7/20; C09D 7/63
See application file for complete search history.

(56) References Cited

U.S. PATENT DOCUMENTS

| | | |
|---|---|---|
| 2012/0097554 A1 | 4/2012 | Shah et al. |
| 2015/0316499 A1 | 11/2015 | Jacks et al. |
| 2020/0000381 A1 | 1/2020 | Lu et al. |
| 2020/0315504 A1 | 10/2020 | Lin et al. |
| 2021/0076993 A1 | 3/2021 | Somasuntharam et al. |

(Continued)

FOREIGN PATENT DOCUMENTS

| | | |
|---|---|---|
| DE | 102019219615 A1 | 6/2021 |
| EP | 2774538 A1 | 9/2014 |

(Continued)

*Primary Examiner* — Nathan T Leong
(74) *Attorney, Agent, or Firm* — Dicke, Billig & Czaja, PLLC (57) ABSTRACT

The present invention relates to a method for producing a layered body comprising at least two layers containing a noble metal in metallic form, which differ from one another in electrical conductivity, porosity, density and/or specific surface unit. The present invention also relates to a layered body obtainable by this method, an electronic component, preferably an electrode, comprising a conductive layer containing a layered body according to the invention, the use of a compound comprising a complex selected from the group consisting of the complexes $(COD)Pt[O(CO)CH(C_2H_5)C_4H_9]_2$, $(COD)Pt[O(CO)C(CH_3)_2C_6H_{13}]_2$ and a mixture thereof, for producing a layer containing platinum in metallic form with a defined density, the use of a compound comprising a complex selected from the group consisting of the complexes $(COD)Pt[O(CO)CH(C_2H_5)C_4H_9]_2$, $(COD)Pt[O(CO)C(CH_3)_2C_6H_{13}]_2$ and a mixture thereof for producing a layer containing platinum in metallic form having a defined specific surface.

10 Claims, 5 Drawing Sheets

(56) References Cited

U.S. PATENT DOCUMENTS

2021/0113117 A1 4/2021 Srinivasan et al.
2022/0364238 A1* 11/2022 Sievi .................. H01B 1/02

FOREIGN PATENT DOCUMENTS

| | | |
|---|---|---|
| EP | 3682799 A2 | 7/2020 |
| WO | 2010014964 A2 | 2/2010 |
| WO | 2012015941 A1 | 2/2012 |
| WO | 2012100133 A2 | 7/2012 |
| WO | 2014195451 A1 | 12/2014 |
| WO | 2015104184 A1 | 7/2015 |
| WO | 2018160696 A1 | 9/2018 |
| WO | 2019156934 A1 | 8/2019 |
| WO | 2019209377 A2 | 10/2019 |
| WO | 2020046883 A1 | 3/2020 |
| WO | 2020046888 A1 | 3/2020 |
| WO | 2021021538 A1 | 2/2021 |
| WO | 2021021867 A1 | 2/2021 |
| WO | 2021058154 A1 | 4/2021 |
| WO | 2021089203 A1 | 5/2021 |

\* cited by examiner

NOBLE METAL COATINGS WITH CONTROLLED MORPHOLOGY

The present invention relates to a method for producing a layered body containing at least two layers containing a noble metal in metallic form, which differ from one another in electrical conductivity, porosity, density and/or specific surface unit. The present invention also relates to a layered body obtainable by this method, an electronic component, preferably an electrode, comprising a conductive layer containing a layered body according to the invention, the use of a composition comprising a complex selected from the group consisting of the complexes $(COD)Pt[O(CO)CH(C_2H_5)C_4H_9]_2$, $(COD)Pt[O(CO)C(CH)_2C_6H_{13}]_2$ and a mixture thereof, for producing a layer containing platinum in metallic form with a defined density, the use of a composition comprising a complex selected from the group consisting of the complexes $(COD)Pt[O(CO)CH(C_2H_5)C_4H_9]_2$, $(COD)Pt[O(CO)C(CH)_2C_6H_{13}]_2$ and a mixture thereof for producing a layer containing platinum in metallic form having a defined specific surface, along with the use of a layer containing platinum in metallic form having a defined specific surface in an electrode of an electrochemical sensor, whose sensitivity is dependent on the porosity of the electrode.

Metal complexes that can be decomposed into the corresponding metal at moderate temperatures are of outstanding importance, for example, for producing electrodes on flexible substrates, such as those used in particular in electronic sensors. Suitable platinum complexes for this purpose of the formula $LM[O(CO)R]_2$, in which L is a nitrogen-free cyclic polyolefin ligand, preferably cyclooctadiene (COD) or pentamethylcyclopentadiene, M is platinum or iridium and R is benzyl, aryl or alkyl having four or more carbon atoms, particularly preferably phenyl, are disclosed, for example, in WO 90/07561 A1. However, the metal complexes serve there as fuel additives. The use of preparations containing platinum complexes for producing platinum layers on substrates is described, for example, in WO 2021/089203 A1, WO 2021/058154 A1 and DE 10 2019 219 615 A1.

In the field of platinum circuits and coatings, in particular those applied to flexible substrates, methods such as, for example, sputtering, electrophoretic deposition or spin coating are used in the methods known from the prior art for producing platinum layers. By means of such methods, dense coating is generally obtained, without the possibility of influencing or adapting the surface morphology of such a coating. As a result, the functionality and the possible properties of such a coating remain limited.

The object of the present invention was to overcome the disadvantages resulting from the prior art in the production of electrically conductive layers containing a noble metal in metallic form, in particular platinum layers.

In particular, the object of the present invention was to specify a method with which layers containing noble metals in metallic form can be produced, in particular platinum layers, which are optimized particularly with regard to their density and/or their morphology for the respective specific purpose.

The present invention was also based on the object of providing electrically conductive layers containing noble metals in metallic form, in particular platinum layers, which are characterized by a particularly high density and thus exhibit particularly high electrical conductivity.

Another object of the present invention was to specify electrically conductive layers containing noble metals in metallic form, in particular platinum layers, which are distinguished by a particularly high specific surface and thus have a particularly high electrochemical sensitivity when used in an electrochemical sensor.

|1a| A contribution to achieving at least one of the above-mentioned objects is made by a 1st embodiment of a method for producing a layered body, comprising the method steps of I) providing
  IA) a first composition Z1 comprising
    an organic solvent OL1;
    at least one organic noble metal complex compound EKV1 dissolved or dispersed in the organic solvent OL1 at the concentration K1;
  and
  IB) a second composition Z2 comprising
    an organic solvent OL2;
    at least one organic noble metal complex compound EKV2 dissolved or dispersed in the organic solvent OL2 at the concentration K2;
II) coating at least a part of the surface of a substrate with the first composition Z1 and heating the coated substrate at a temperature T1 to obtain a first layer S1 having a thickness D1, which contains a noble metal in metallic form;
III) coating at least a part of the first layer S1 containing a noble metal with the second composition Z2 and heating the coated substrate at a temperature T2 to obtain a second layer S2 containing a noble metal in metallic form and having a thickness D2, which at least partially covers the first layer S1 containing a noble metal;

wherein the organic noble metal complex compounds EKV1 and EKV2, the organic solvents OL1 and OL2, the concentrations K1 and K2, the thickness D1 and D2 and the temperatures T1 and T2 are selected or adapted in such a manner that the first and second layers S1 and S2 containing a noble metal differ from one another in at least one of the following properties:
  ($\alpha$) electrical conductivity;
  ($\beta$) porosity;
  ($\gamma$) density;
  ($\delta$) specific surface unit.

In this connection, it is particularly preferred that the first and second layers S1 and S2 containing a noble metal differ from one another in at least one of the following properties or combinations of properties: $\alpha$, $\beta$, $\gamma$, $\delta$, $\alpha\beta$, $\alpha\gamma$, $\alpha\delta$, $\alpha\beta\gamma$, $\alpha\beta\delta$, $\beta\gamma\delta$ and $\alpha\beta\gamma\delta$.

By combining two layers containing a noble metal, in the production of which it has been ensured through the selection of noble metal complex compounds and/or through the specific adaptation of the method parameters that such two layers differ from one another in their electrical conductivity, their porosity, their density and/or their specific surface unit, it is possible to produce layered bodies that can be adapted and thus optimized quite specifically for their requirements when used as a conductive layer, for example in an electrode of an electrochemical sensor. Thus, for example, a layered body comprising a dense platinum layer and a platinum layer bonded thereto with a high specific surface combines the advantages of high conductivity (which is greater the denser the layer) with high electrochemical sensitivity (which is greater the greater the specific surface). A layered body comprising a dense platinum layer and a platinum layer with a high porosity bonded thereto, in turn, may prove advantageous when used in an electrode that comes into contact with, for example, body tissue or body fluids, since the presence of the dense platinum layer in particular increases lateral conductivity.

|2a| In accordance with a preferred embodiment of a method for producing a layered body, the organic solvents OL1 and OL2, each independently of one another, are selected from the group consisting of propylene glycol n-propyl ether (PnP), ethanol or a mixture thereof, preferably a mixture in the volume ratio PnP: Ethanol in the range from 4:1 to 1:4, preferably in the range from 3:1 to 1:3, particularly preferably in the range from 2:1 to 1:2 and most preferably in the volume ratio of 1:1. This preferred embodiment is a 2nd embodiment of the method according to the invention, which is preferably dependent on the 1st embodiment.

|3a| In accordance with a further preferred embodiment of a method for producing a layered body, the compositions Z1 and Z2, independently of one another, contain the organic solvents OL1 and OL2, respectively, in an amount in a range from 30 to 90% by weight, particularly preferably in a range from 40 to 85% by weight and most preferably in a range from 50 to 80% by weight, each based on the total weight of the compositions Z1 and Z2, respectively (the formulation "independently of one another" is intended to clarify that the amount of organic solvent in the first and second compositions Z1 and Z2, respectively, need not necessarily be identical). In the case of a mixture of two or more organic solvents, the above-mentioned concentrations refer to the total amount of organic solvents in compositions Z1 and Z2, respectively. This preferred embodiment is a 3rd embodiment of the method according to the invention, which is preferably dependent on the 1st or 2nd embodiment.

|4a| In accordance with a further preferred embodiment of a method for producing a layered body, the organic noble metal complex compounds EKV1 and EKV2, independently of one another, comprise platinum complexes of the type $[L1L2Pt[O(CO)R^1]X]_n$, wherein L1 and L2 represent the same or different monoolefin ligands or together represent a compound L1L2 acting as a diolefin ligand, wherein X is selected from bromide, chloride, iodide and —O(CO)$R^2$, wherein —O(CO)$R^1$ and —O(CO)$R^2$ represent the same or different non-aromatic $C_8$-$C_{18}$ monocarboxylic acid groups or together represent a non-aromatic $C_8$-$C_{18}$ dicarboxylic acid group —O(CO)$R^1R^2$(CO)O—, wherein said platinum complexes are mononuclear platinum complexes with n=1 or, in the case of the presence of L1L2 and/or of —O(CO)R1R2(CO)O—, can be polynuclear platinum complexes with a whole number n>1 (the formulation "independently of one another" is again intended to clarify that the complexes platinum complexes of the type $[L1L2Pt[O(CO)R^1]X]_n$ in the first and second compositions Z1 and Z2, respectively, need not necessarily be identical).

This preferred embodiment is a 4th embodiment of the method according to the invention, which is preferably dependent on one of the embodiments 1 to 3.

|5a| In accordance with a further preferred embodiment of a method for producing a layered body, the organic noble metal complexes EKV1 and EKV2 are platinum complexes, independently of one another, of the formula $[(L1L2)Pt[O(CO)R^1]_2]_n$, wherein n is 1 or 2, L1L2 is cyclooctadiene or norbornadiene, and $R^1$ is a $C_7$-$C_{17}$ non-aromatic hydrocarbon group. This preferred embodiment is a 5th embodiment of the method according to the invention, which is preferably dependent on one of the embodiments 1 to 4.

|6a| In accordance with a further preferred embodiment of a method for producing a layered body, the organic noble metal complexes EKV1 and EKV2 are platinum complexes, independently of one another, selected from the group consisting of the complexes (COD)Pt[O(CO)CH($C_2H_5$)$C_4H_9$]$_2$ (hereinafter referred to as "PtE Complex"), (COD)Pt[O(CO)C($CH_3$)$_2C_6H_{13}$]$_2$ (hereinafter referred to as "PtV Complex") and a mixture thereof. This preferred embodiment is a 6th embodiment of the method according to the invention, which is preferably dependent on one of the embodiments 1 to 5.

|7a| In accordance with a further preferred embodiment of a method for producing a layered body, the compositions Z1 and Z2, independently of one another, have a noble metal content originating from the at least one organic noble metal complex compound in a range from 2.5 to 25% by weight, particularly preferably in a range from 2.5 to 15% by weight and most preferably in a range from 5 to 10% by weight. This preferred embodiment is a 7th embodiment of the method according to the invention, which is preferably dependent on one of the embodiments 1 to 6.

|8a| In accordance with a further preferred embodiment of a method for producing a layered body, K1 and K2, independently of one another, are located in a range from 5 to 75% by weight, particularly preferably in a range from 10 to 50% by weight and most preferably in a range from 10 to 30% by weight. %, in each case based on the total weight of the first composition Z1 and the second composition Z2, respectively, wherein, in the case of a mixture of two or more different organic noble metal complex compounds, such concentrations are based on the total amount of organic noble metal complex compounds (the formulation "independently of one another" is again intended to clarify that K1 and K2 need not necessarily be identical). This preferred embodiment is an 8th embodiment of the method according to the invention, which is preferably dependent on one of the embodiments 1 to 7.

|9a| In accordance with a further preferred embodiment of a method for producing a layered body, T1 and T2, independently of one another, are located in a range from 125° C. to 350° C., preferably in a range from 150° C. to 300° C., particularly preferably in a range from 175° C. to 275° C. and most preferably in a range from 180 to 220° C. (the formulation "independently of one another" is also intended here to clarify that T1 and T2 need not necessarily be identical). This preferred embodiment is a 9the embodiment of the method according to the invention, which is preferably dependent on one of the embodiments 1 to 8.

|10a| In accordance with a further preferred embodiment of a method for producing a layered body, D1 and D2, independently of one another, are located in a range from 20 nm to 5 µm, preferably in a range from 250 nm to 2.5 µm, and most preferably in a range from 250 nm to 1 µm (here as well, the formulation "independently of one another" is intended to clarify that D1 and D2 need not necessarily be identical). This preferred embodiment is a 10th embodiment of the method according to the invention, which is preferably dependent on one of the embodiments 1 to 9.

[11a] In accordance with a further preferred embodiment of a method for producing a layered body, the substrate comprises a plurality of materials selected from the group consisting of glass, ceramics, metal, plastics, modified or non-modified polymers of natural origin, cardboard and paper. This preferred embodiment is a 11th embodiment of the method according to the invention, which is preferably dependent on one of the embodiments 1 to 10.

[12a] In accordance with a further preferred embodiment of a method for producing a layered body, the first composition Z1, the second composition Z2 or both compositions include an additive selected from the group consisting of wetting additives, rheology additives, defoamers, deaerators, additives for influencing surface tension, and odorants, wherein the amount of such additives is preferably in a range from 0 to 10% by weight, preferably from 0 to 6% by weight and most preferably from 0 to 3% by weight, in each case based on the total weight of the composition Z1 or Z2 (wherein, in the case of a combination of two or more of such additives, such amount is based on the total amount of additives). This preferred embodiment is a 12th embodiment of the method according to the invention, which is preferably dependent on one of the embodiments 1 to 11.

[13a] In accordance with a further preferred embodiment of a method for producing a layered body, the coating of at least a part of the surface of a substrate with the first composition Z1 in method step III) and/or the coating of at least a part of the first layer S1 containing a noble metal with the second composition Z2 in method step IV) is performed by a method selected from the group consisting of dipping, spray application, printing, application by brush, application by brush, application by felt, application by cloth or by a combination of at least two of these methods. This preferred embodiment is a 13th embodiment of the method according to the invention, which is preferably dependent on one of the embodiments 1 to 12.

[14a] In accordance with a further preferred embodiment of a method for producing a layered body, the layer of the first composition Z1 applied to at least a part of the surface of a substrate in method step III) and/or the layer of the second composition Z2 applied to at least a part of the first layer S1 containing a noble metal in method step IV) is first dried and in the process partially or completely freed from the organic solvent OL1 or OL2, respectively, before being subjected to thermal decomposition by heating. This preferred embodiment is a 14th embodiment of the method according to the invention, which is preferably dependent on one of the embodiments 1 to 13.

[15a] In accordance with a further preferred embodiment of a method for producing a layered body, the heating in method step III) and/or the heating in method step IV) is performed in a kiln or by infrared irradiation. This preferred embodiment is a 15th embodiment of the method according to the invention, which is preferably dependent on one of the embodiments 1 to 14.

[16a] In accordance with a further preferred embodiment of a method for producing a layered body in method step (III), a first composition Z1 containing a PtV complex as organic noble metal complex compound EKV1 and propylene glycol n-propyl ether as organic solvent OL1 is used;

in method step (IV) a second composition Z2 containing a PtE complex, a PtV complex or a mixture thereof, preferably a PtE complex, is used as organic noble metal complex compound EKV2 and propylene glycol n-propyl ether, ethanol or a mixture thereof is used as organic solvent OL2.

In this connection, it is particularly preferred a) that the first layer S1 containing a noble metal in metallic form has a density that corresponds to at least 90%, particularly preferably at least 95%, still more preferably at least 97.5% and most preferably at least 99% of the theoretical density of platinum, and that the second layer S2 containing a noble metal in metallic form preferably has a density that corresponds to less than 90%, particularly preferably less than 75%, still more preferably less than 60% and most preferably less than 60% of the theoretical density of platinum;

and/or b) that the first layer S1 containing a noble metal in metallic form has a specific surface unit of less than $1 \times 10^8$ m$^{-1}$, particularly preferably of less than $1 \times 10^7$ m$^{-1}$ and most preferably of less than $1 \times 10^6$ m$^{-1}$, and that the second layer S2 containing a noble metal in metallic form preferably has a specific surface unit of at least $1 \times 10^6$ m$^{-1}$, particularly preferably of at least $1 \times 10^7$ m$^{-1}$ and most preferably of at least $1 \times 10^8$ m$^{-1}$;

and/or c) that the first layer S1 containing a noble metal in metallic form has a porosity of less than 10% by volume, preferably of less than 5% by volume and most preferably of less than 1% by volume, and that the second layer S2 containing a noble metal in metallic form preferably has a porosity of at least 25% by volume, most preferably of at least 40% by volume and most preferably of at least 50% by volume.

In this connection, preferred embodiments are those in which the following conditions or combinations of conditions are realized: a), b), c), a)b), a)c), b)c) and a)b)c).

[17a] In accordance with a further preferred embodiment of a method for producing a layered body, the method additionally comprises the method steps of I) providing IC) a third composition Z3 comprising
  an organic solvent OL3;
  at least one organic noble metal complex compound EKV3 dissolved or dispersed in the organic solvent OL3 at the concentration K3;

IV) coating at least a part of the second layer S2 containing a noble metal with the third composition Z3 and heating the coated substrate at a temperature T3 to obtain a third layer S3 containing a noble metal in metallic form and having a thickness D3, which at least partially covers the second layer S3 containing a noble metal;

wherein the organic noble metal complex compounds EKV2 and EKV3, the organic solvents OL2 and OL3, the concentrations K2 and K3, the thickness D2 and D3 and the temperatures T2 and T3 are selected or adapted in such a manner that the second and third layers S2 and S3 containing a noble metal differ from one another in at least one of the following properties:

(α) electrical conductivity;
(β) porosity;
(γ) density;
(δ) specific surface unit.

In this connection, it is particularly preferred that the first and second layers S2 and S3 containing a noble metal differ from one another in at least one of the following properties or combinations of properties: α, β, γ, δ, αβ, αγ, αδ, αβγ, αβδ, βγδ and αβγδ. This preferred embodiment is a 17th embodiment of the method according to the invention, which is preferably dependent on one of the embodiments 1 to 16.

Preferred organic solvents OL3, organic noble metal complex compounds EFV3, concentrations K3, temperatures T3 and thicknesses D3 are those organic solvents, organic noble metal complex compounds, concentrations, temperatures and thicknesses that have been described above.

A contribution to achieving at least one of the above-mentioned objects is also made by a layered body obtainable by the method according to the invention for producing a layered body, preferably by the method according to the invention for producing a layered body according to one of the embodiments 1 to 17.

|1b| A contribution to the achievement of at least one of the above-mentioned objects is also made by a 1st embodiment of a layered body, comprising
i) a substrate;
ii) a first layer S1 with a thickness D1 covering at least a part of the surface of the substrate and containing a noble metal in metallic form;
iii) a second layer S2 with a thickness D2 covering at least a part of the first layer S1 and containing a noble metal in metallic form;
wherein the first and second layers S1 and S2 containing a noble metal differ from one another in at least one of the following properties:
(α) electrical conductivity;
(β) porosity;
(γ) density;
(δ) specific surface unit.

In this connection, it is particularly preferred that the first and second layers S1 and S2 containing a noble metal differ from one another in at least one of the following properties or combinations of properties: α, β, γ, δ, αβ, αγ, βδ, αβγ, αβδ, βγδ, and αβγδ.

|2b| In accordance with a preferred embodiment of a layered body, the substrate comprises a plurality of materials selected from the group consisting of glass, ceramics, metal, plastic, modified or non-modified polymers of natural origin, cardboard and paper. This preferred embodiment is a 2nd embodiment of the layered body according to the invention, which is preferably dependent on the 1st embodiment.

|3b| In accordance with a further preferred embodiment of the layered body, D1 and D2, independently of one another, are located in a range from 50 nm to 5 μm, preferably in a range from 250 nm to 2.5 μm, and most preferably in a range from 500 nm to 1 μm. This preferred embodiment is a 3rd embodiment of the layered body according to the invention, which is preferably dependent on the 1st or 2nd embodiment.

|4b| In accordance with a further preferred embodiment of the layered body, the noble metal is metallic platinum. This preferred embodiment is a 4th embodiment of the layered body according to the invention, which is preferably dependent on one of embodiments 1 to 3.

|5b| In accordance with a further preferred embodiment of the layered body, the noble metal is metallic platinum, wherein
a) the first layer S1 containing a noble metal in metallic form has a density that corresponds to at least 90%, particularly preferably at least 95%, still more preferably at least 97.5% and most preferably at least 99% of the theoretical density of platinum, and the second layer S2 containing a noble metal in metallic form preferably has a density that corresponds to less than 90%, particularly preferably less than 75%, still more preferably less than 60% and most preferably less than 60% of the theoretical density of platinum;
and/or
b) the first layer S1 containing a noble metal in metallic form has a specific surface unit of less than $1\times10^8$ m$^{-1}$, particularly preferably of less than $1\times10^7$ m$^{-1}$ and most preferably of less than $1\times10^6$ m$^{-1}$, and the second layer S2 containing a noble metal in metallic form preferably has a specific surface unit of at least $1\times10^6$ m$^{-1}$, particularly preferably of at least $1\times10^7$ m$^{-1}$ and most preferably of at least $1\times10^8$ m$^{-1}$;
and/or
c) the first layer S1 containing a noble metal in metallic form has a porosity of less than 10% by volume, preferably of less than 5% by volume and most preferably of less than 1% by volume, and the second layer S2 containing a noble metal in metallic form preferably has a porosity of at least 25% by volume, most preferably of at least 40% by volume and most preferably of at least 50% by volume.

In this connection, preferred embodiments are those in which the following conditions or combinations of conditions are realized: a), b), c), a)b), a)c), b)c) and a)b)c).

This preferred embodiment is a 5th embodiment of the layered body according to the invention, which is preferably dependent on one of the embodiments 1 to 4.

|6b| In accordance with a further preferred embodiment of the layered body, the layered body further comprises
iv) a third layer S3 with a thickness D3 covering at least a part of the second layer S2 and containing a noble metal in metallic form;
wherein the second and third layers S2 and S3 containing a noble metal differ from one another in at least one of the following properties:
(α) electrical conductivity;
(β) porosity;
(γ) density;
(δ) specific surface unit.

In this connection, it is particularly preferred that the first and second layers S2 and S3 containing a noble metal differ from one another in at least one of the following properties or combinations of properties: α, β, γ, δ, αβ, αγ, αδ, αβγ, αβδ, βγδ and αβγδ. This preferred embodiment is a 6th embodiment of the layered body according to the invention, which is preferably dependent on one of the embodiments 1 to 5.

A contribution to the achievement of at least one of the above-mentioned objects is also made by the use of a layered body obtainable by the method according to the invention or of a layered body according to the invention for producing a conductive layer in an electronic component, preferably in an electrode, particularly preferably for producing an electrode in an electrochemical sensor, most preferably for producing an electrode of an electrochemical sensor whose sensitivity depends on the porosity of the electrode.

A contribution to the achievement of at least one of the above-mentioned objects is also made by an electronic component, preferably an electrode, particularly preferably an electrode in an electrochemical sensor, most preferably an electrode in an electrochemical sensor, whose sensitivity depends on the porosity of the electrode, containing a conductive layer containing a layered body obtainable by the method according to the invention or a layered body according to the invention.

A contribution to the achievement of at least one of the above-mentioned objects is also made by the use of a composition comprising an organic solvent, preferably propylene glycol n-propyl ether, ethanol or a mixture thereof, at least one organic noble metal complex compound dissolved or dispersed in the organic solvent containing at least one complex selected from the group consisting of a PtE complex, a PtV complex and a mixture thereof, particularly preferably containing a PtV complex, for producing a layer containing platinum in metallic form having a density corresponding to at least 90%, more preferably at least 95%, still more preferably at least 97.5% and most preferably at least 99% of the theoretical density of platinum.

Conductive layers with such a high density are particularly advantageous for applications in which, for example, high lateral conductivity is desired in electrodes. This is a very important property, in particular in cases where the signal generated on the one side of the electrode (e.g., on the sensor side) needs to be transmitted over relatively large distances to the other side connected to the electronics system of such a device that needs to detect such a signal. In addition, in some applications, the electrical interface between a device and an organic tissue or an interstitial fluid is an organic membrane/interface. Typically, such interfaces are applied/coated on metal electrodes, which then transmit the detected signal or are used to transfer the stimulation signal from or to tissue. An increase in the conductivity by increasing the density of the platinum in the conductive layers leads to a better signal transmission between the device and the desired organic location. Dense platinum layers also lead to the fact that, when applied to metal surfaces, for example, these can be hermetically shielded by the platinum layer, in such a manner that an interaction of such metal layers with body tissue or body fluids can be largely prevented.

Particularly advantageous is the above-described use of a composition for producing the layer S1 or the layer S2 in the method according to the invention for producing a layered body, particularly preferably for producing the layer S1.

A contribution to the achievement of at least one of the above-mentioned objects is also made by the use of a composition comprising an organic solvent, preferably propylene glycol n-propyl ether, ethanol or a mixture thereof, at least one organic noble metal complex compound dissolved or dispersed in the organic solvent and containing at least one complex selected from the group consisting of a PtE complex, a PtV complex and a mixture thereof, particularly preferably a PtE complex, for producing a layer containing platinum in metallic form having a specific surface unit of at least $1\times10^6$ m$^{-1}$, particularly preferably of at least $1\times10^7$ m$^{-1}$ and most preferably of at least $1\times10^8$ m$^-$.

Conductive layers with such a high specific surface are desired primarily for applications of the platinum layers as catalysts.

Particularly advantageous is the above-described use of a composition for producing the layer S1 or the layer S2 in the method according to the invention for producing a layered body, particularly preferably for producing the layer S2.

A contribution to the achievement of at least one of the above-mentioned objects is also made by the use of a layer containing platinum in metallic form with a specific surface unit of at least $1\times10^6$ m$^{-1}$, particularly preferably at least $1\times10^7$ m$^{-1}$ and most preferably at least $1\times10^8$ m$^{-1}$ in an electrode of an electrochemical sensor, whose sensitivity depends on the porosity of the electrode. In this connection, it is particularly preferred that the layer containing platinum in metallic form has been produced by a method comprising the steps of:

I) providing a composition comprising an organic solvent and at least one complex selected from the group consisting of a PtE complex, a PtV complex and a mixture thereof, particularly preferably a PtE complex;

II) coating at tleast a part of the surface of a substrate with the composition and heating the coated substrate to obtain the layer containing platinum in metallic form having a specific surface unit of at least $1\times10^6$ m$^{-1}$, particularly preferably at least $1\times10^7$ m$^{-1}$ and most preferably at least $1\times10^8$ m$^{-1}$.

Production of the Organic Platinum Complexes Used According to the Invention The platinum complexes [L1L2Pt[O(CO)R$^1$]X]$_n$ can be produced in a simple way by ligand exchange, especially without using carboxylic acid salts of silver. The production method includes mixing and suspending or emulsifying a two-phase system. Thereby, the one phase comprises a reactant of the [L1L2PtX$_2$]$_n$ type with X selected from bromide, chloride and iodide, preferably chloride, either as such or in the form of an at least substantially water-immiscible organic solution of such a reactant. Preferred reactants include [L1L2PtCl$_2$]$_n$ with n as a whole number from 1 to 5, in particular with n=1. Examples of suitable at least substantially water-immiscible organic solvents also include oxygen-containing solvents, for example corresponding water-immiscible ketones, esters, and ethers, in addition to aromatics and chlorinated hydrocarbons such as toluene, xylene, di-, tri-, and tetrachloromethane. By contract, the other phase comprises an aqueous solution of alkali salt (in particular sodium or potassium salt) and/or of magnesium salt of a $C_8$-$C_{18}$ monocarboxylic acid of the RCOOH type and, optionally, additionally of the R$^2$COOH type or corresponding alkali salt and/or magnesium salt of a C8-C18 dicarboxylic acid of the HOOCR$^1$R$^2$COOH type. The selection of the type of carboxylic acid salt(s) depends on the type of platinum complex to be produced or the combination of platinum complexes to be produced. The two phases are intensively mixed, for example by shaking and/or stirring, thereby forming a suspension or an emulsion. For the purpose of maintaining the state of the suspension or emulsion, mixing is performed for a duration of 0.5 to 24 hours, for example, at a temperature in the range from 20 to 50° C. The ligand exchange takes place in the process, wherein the platinum complex or complexes formed dissolves in the organic phase, while the alkali X salt or MgX$_2$ salt likewise formed dissolves in the aqueous phase. Upon completion of the suspension or emulsification, organic and aqueous phase are separated from one another. The platinum complex or complexes formed can be obtained from the organic phase and, if necessary, subsequently purified by means of conventional methods.

For example, a PtE complex can be preduced by emulsifying together a solution of (COD)PtCl$_2$ in dichloromethane with an aqueous solution of sodium 2-ethylhexanoate anion of ethylhexanoic acid
(and a PtV complex correspondingly by emulsifying together a solution of (COD)PtCl$_2$ in dichloromethane with an aqueous solution of sodium neodecanoate)

anion of neodecanoic acid.

After emulsification is complete, the saline solution formed by ligand exchange can be separated from the dichloromethane phase, and the PtE complex can be isolated from the dichloromethane phase and, if necessary, purified by standard purification procedures. For example, the platinum complex (COD)Pt[O(CO)CH(C$_2$H$_5$)C$_4$H$_9$]Cl can also be produced analogously if the stoichiometry is selected accordingly.

Production of the Compositions Used According to the Invention

The compositions used in the methods or uses according to the invention containing an organic solvent and at least one organic noble metal complex compound dissolved or dispersed in the organic solvent can be produced by simply mixing the organic noble metal complex compound, the organic solvent and optionally further additives, for example rheological additives, defoamers, deaerators, additives for influencing surface tension and odorants. The person skilled in the art selects the quantitative ratio of the components, adapted to the respective intended use and/or to the application method used therein.

The organic solvent(s) can be selected from a plurality of common organic solvents, since the platinum complexes have good to unlimited solubility in such organic solvents. Expediently, the organic solvent(s) is/are substantially volatile under the processing conditions of the preparations used in the method or uses according to the invention; this applies in particular to the stage after the preparation has been applied to a substrate. In general, the boiling points of the organic solvent(s) are in the range from 50 to 200° C. or higher, for example 50 to 300° C. Examples of organic solvents include aliphatics and cycloaliphatics, each having 6 to 12 carbon atoms; halohydrocarbons such as di-, tri- and tetrachloromethane; aromatics; araliphatics such as toluene or xylene; alcohols such as ethanol, n-propanol and isopropanol; ethers; glycol ethers such as mono-C1-C4 alkyl glycol ethers and di-C1-C4 alkyl glycol ethers, for example ethylene glycol mono-C1-C4 alkyl ether, ethylene glycol di-C1-C4 alkyl ether, diethylene glycol mono-C1-C4 alkyl ether, diethylene glycol di-C1-C4 alkyl ether, propylene glycol mono-C1-C4 alkyl ether, propylene glycol di-C1-C4 alkyl ether, dipropylene glycol mono-C1-C4 alkyl ether and dipropylene glycol di-C1-C4 alkyl ether; esters having 2 to 12 carbon atoms; and ketones such as acetone, methyl ethyl ketone, methyl isobutyl ketone and cyclohexanone. Araliphatics such as toluene or xylene, alcohols such as ethanol, n-propanol and isopropanol, and glycol ethers such as mono-C1-C4 alkyl glycol ether and di-C1-C4 alkyl glycol ether, for example ethylene glycol mono-C1-C4 alkyl ether, ethylene glycol di-C1-C4 alkyl ether, diethylene glycol mono-C1-C4 alkyl ether, diethylene glycol di-C1-C4 alkyl ether, propylene glycol mono-C1-C4 alkyl ether, propylene glycol di-C1-C4 alkyl ether, dipropylene glycol mono-C1-C4 alkyl ether and dipropylene glycol di-C1-C4 alkyl ether.

Particularly preferred organic solvents are propylene glycol n-propyl ether, ethanol or a mixture thereof.

Production of a Layer Containing Noble Metal in Metallic Form

For producing the layer containing a noble metal in metallic form, in the method according to the invention or in the uses according to the invention, the compositions containing the organic solvent, the at least one organic noble metal complex compound dissolved or dispersed in the organic solvent and optionally the additives are applied on a substrate (or in the case of method step IV) in the method according to the invention for producing a layered body are applied on the layer S1) containing a noble metal in metallic form produced in method step III).

The substrates can comprise only one or even several materials. Examples of materials include, inter alia, glass; carbide substrates such as titanium carbide, molybdenum carbide, tungsten carbide, silicon carbide; nitride substrates such as aluminum nitride, titanium nitride, silicon nitride; boride substrates such as titanium boride, zirconium boride; ceramic substrates including those based on oxide ceramics and those commonly used as catalyst supports in heterogeneous catalysts; semiconductor substrates such as silicon substrates; metal; plastic; modified or unmodified polymers of natural origin; carbon substrates; wood; cardboard and paper. The substrates can be provided with the coating layer on inner and/or outer surfaces and/or on inner and/or outer surface parts.

When coating a substrate with the composition containing the organic solvent and the at least one organic noble metal complex compound dissolved or dispersed in the organic solvent, application methods known per se may be used.

A first application method is dipping. In the process, the substrate is immersed in the composition and removed again. Preferably, the proportion of the organic solvent in the immersion is in the range from 30 to 90% by weight (in the case of a mixture of two or more different organic solvents, this corresponds to the total amount of organic solvent) and of the organic noble metal complex compound in the range from 5 to 75% by weight (in the case of a mixture of two or more different organic noble metal complex compounds, this again corresponds to the total amount of organic noble metal complex compounds), in each case based on the total weight of the composition.

A second application method is spray application. In the process, the substrate is spray coated with composition using a conventional spray coating tool. Examples of spray-coating tools are pneumatic spray guns, airless spray guns, rotary atomizers, or the like. Preferably, the proportion of organic solvent used in printing is in the range from 50 to 90% by weight of the composition and the proportion of organic noble metal complex compound is in the range from 10 to 50% by weight.

A third application method is printing. In this case, the substrate is printed with the composition. Thereby, a preferred printing method is inkjet printing; the composition here represents a coating agent in the form of an ink. A further preferred printing method is screen printing. Preferably, the proportion of organic solvent used in printing is in the range from 50 to 90% by weight of the composition and the proportion of organic noble metal complex compound is in the range from 10 to 50% by weight.

A fourth application method is the application by means of an application tool saturated with the composition, for example a paintbrush, a brush, felt or a cloth. In the process, the composition is transferred from the application tool to the substrate. Preferably, the proportion of organic solvent with such an application technique is in the range from 30 to 90% by weight of the composition and the proportion of organic noble metal complex compound is in the range from 10 to 70% by weight.

The coating layer comprising the at least one organic noble metal complex compound applied from a composition can first be dried and thereby partially or completely freed from the organic solvent before it or the dried residue is subjected to thermal decomposition, forming the layer containing a noble metal in metallic form. Optionally, a plurality of successive dried layers can be produced before the thermal decomposition, in which thermal decomposition then takes place together.

The thermal treatment taking place for he purpose of thermal decomposition comprises heating to an object temperature above the decomposition temperature of the at least one organic noble metal complex compound. If several different noble metal complexes are present, the person skilled in the art will select the object temperature above the decomposition temperature of the noble metal complex with the highest decomposition temperature. For this purpose, for example, heating is generally performed briefly to an object temperature above the decomposition temperature, for example, for a duration of 1 minute to 30 minutes to an object temperature in the range from 125° C. to 350° C., preferably in a range from 150° C. to 300° C., particularly preferably in a range from 175° C. to 275° C., and most preferably in a range from 180 to 220° C. Heating can, in particular, take place in a kiln and/or by infrared irradiation. In general, an object temperature is selected to be slightly above the decomposition temperature in question. In general, heating, more precisely maintaining the object temperature, does not take longer than 15 minutes.

According to the invention, it has now been shown that the structural properties of the layers containing a noble metal in metallic form, in particular with regard to electrical conductivity, porosity, density and/or specific surface unit, can be adjusted in a targeted manner by the type of organic noble metal complex used and the organic solvent selected and/or by the precise conditions under which the layer containing the noble metal in metallic form is produced, in particular by the concentration in which the organic noble metal complex compound is contained in the composition, by the temperature at which the organic noble metal complex compound is thermally decomposed and by the thickness in which the layer containing a noble metal in metallic form is ultimately formed. This makes it possible to produce custom noble metal layers for the intended use. In particular, by combining two or more layers containing a noble metal in metallic form, which differ from one another in terms of electrical conductivity, porosity, density and/or specific surface unit, in the form of the coating body according to the invention, coatings can be obtained with properties that cannot be achieved with any previously known combination of material and manufacturing process.

The invention will now be explained in more detail with reference to non-limiting figures and examples.

Figure 1:
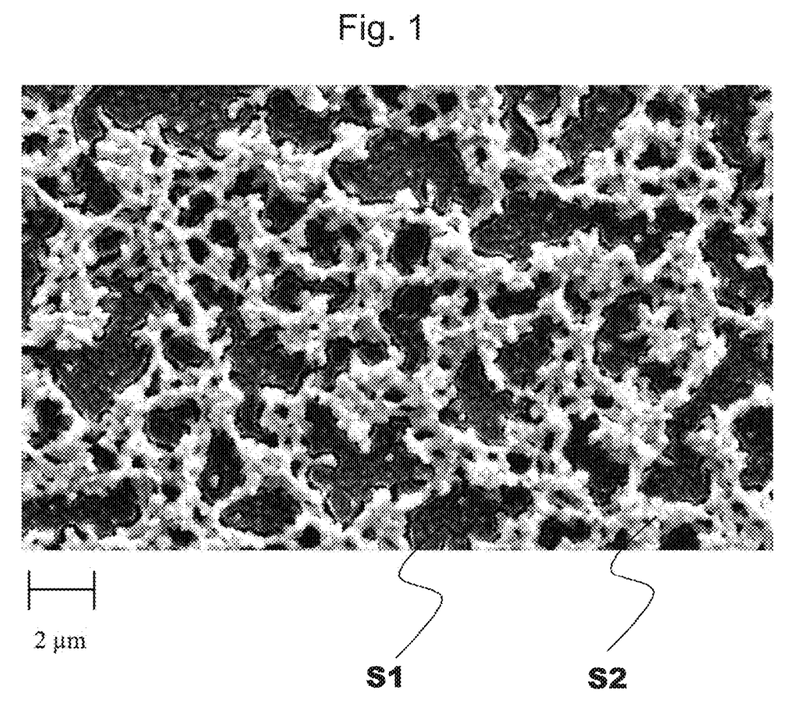
Figure 5A:
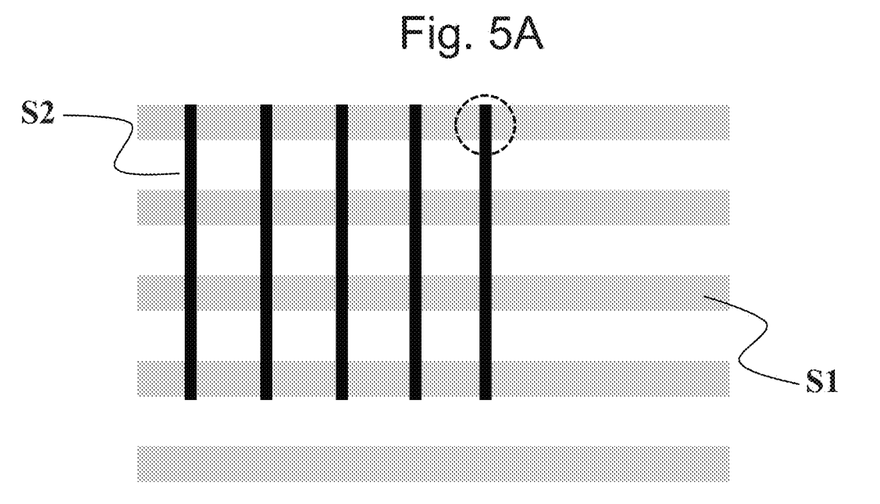

FIG. 1 shows an SEM image of a layered body according to the invention comprising two layers S1 and S2 containing platinum in metallic form, wherein the layer S1 is formed by coating a substrate (polyimide) with a composition containing the PtE complex dissolved in a mixture of PnP and ethanol (1:1) and subsequent thermal decomposition of the complex at a temperature of 220° C., and the layer S2 is obtained by coating the layer S1 with a composition containing the PtV xomplex dissolved in PnP and subsequent thermal decomposition of the complex at a temperature of 200° C. The coating was performed by means of inkjet printing, with PtE lines applied in parallel at a distance of 6 mm with a width of 3 mm and a length of 50 mm (first layer S1) and PtV lines applied thereon in parallel at a distance of 5 mm with a width of 1 mm and a length of 25 mm (second layer S2), wherein the PtE and PtV lines were applied perpendicularly to one another (as shown in FIG. 5A). If necessary, the layer S1, the layer S2 and both layers can also be obtained by applying the composition containing the platinum complex several times in succession, each followed by a thermal treatment step, or by applying the composition containing the platinum complex several times in succession and then drying, wherein the thermal decomposition is then performed in the dried layers together.

Figure 2:
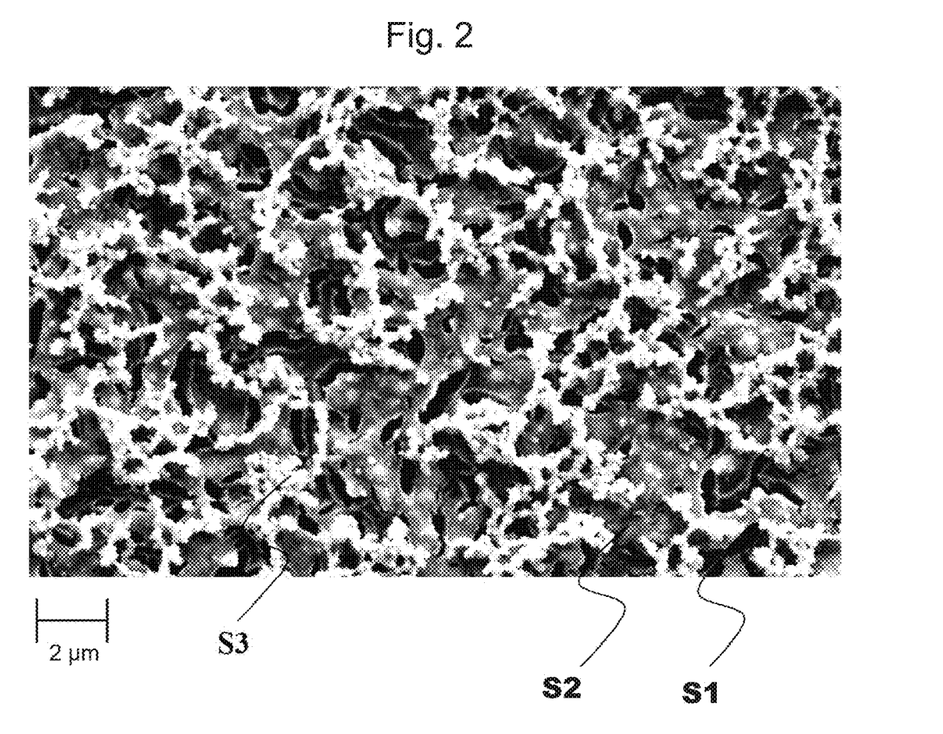
Figure 5B:
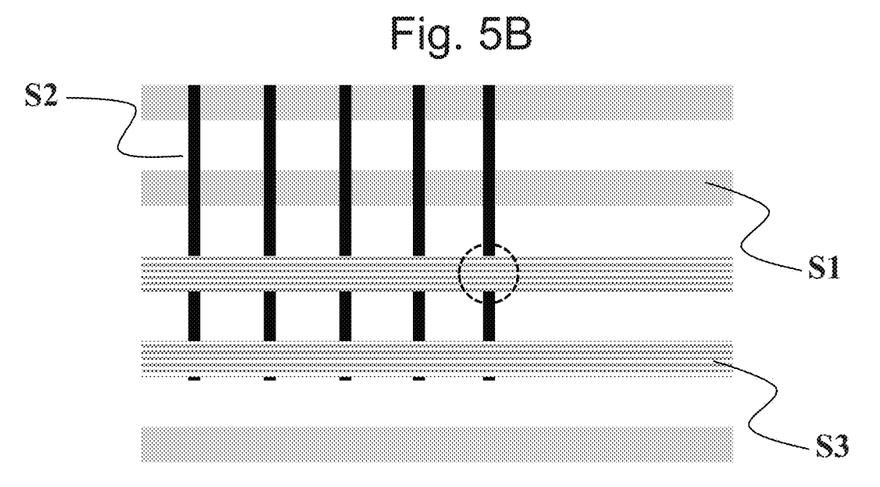

FIG. 2 shows an SEM image of a layered body according to the invention comprising three layers S1, S2 and S3 containing platinum in metallic form, wherein the layer S1 is formed by coating a substrate (polyimide) with a composition containing the PtE complex dissolved in a mixture of PnP and ethanol (1:1) and subsequent thermal decomposition of the complex at a temperature of 200° C., and the layer S2 is obtained by coating the layer S1 with a composition containing the PtV complex dissolved in PnP and subsequent thermal decomposition of the complex at a temperature of 200° C., and the layer S3 is obtained by coating the layer S2 with a composition containing the PtE complex dissolved in a mixture of PnP and ethanol (1:1) and subsequent thermal decomposition of the complex at a temperature of 220° C. Here as well, the coating was applied by means of inkjet printing, with PtE lines applied in parallel at a distance of 6 mm, with a width of 3 mm and a length of 50 mm (first layer S1), PtV lines with a width of 1 mm and a length of 25 mm (second layer S2) applied in parallel at a distance of 5 mm, and PtE lines with a width of 3 mm and a length of 50 mm (third layer S3) applied again in parallel at a distance of 6 mm, wherein the PtE and PtV lines are applied perpendicularly to one another (as shown in FIG. 5B). Here was well, the layer S1, the layer S2, the layer S3 or at least two of these layers can be obtained by applying the composition containing the platinum complex several times in succession, each followed by a thermal treatment step, or by applying the composition containing the platinum complex several times in succession and then drying, wherein the thermal decomposition is then performed in the dried layers together.

Figure 3A:
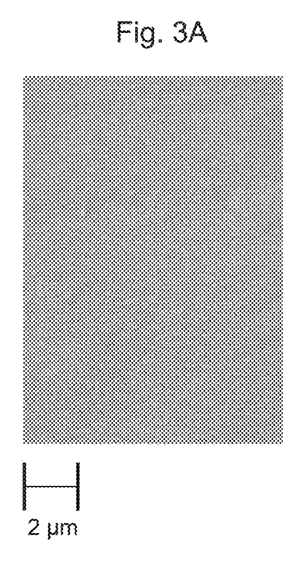
Figure 3B:
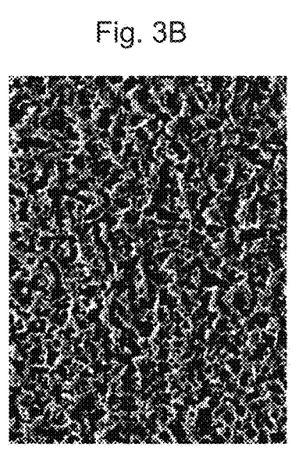
Figure 3C:
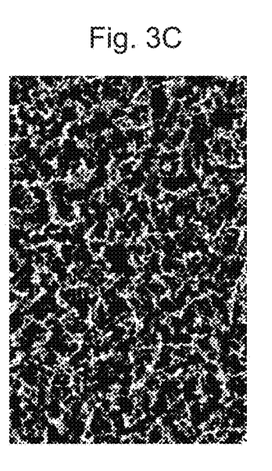

FIG. 3 shows SEM images of monolayers that differ from one another due to their density or porosity. The layer on the left (FIG. 3A) shows a layer containing platinum in metallic form obtained by coating a substrate (polyimide) with a composition containing the PtV complex dissolved in propylene glycol n-propyl ether and subsequent thermal decomposition of the complex at a temperature of 200° C. The layer in the middle (FIG. 3B) shows a layer containing platinum in metallic form, obtained by coating a substrate (polyimide) with a composition containing the PtV complex in a mixture (1:1) of PnP and ethanol and subsequent thermal decomposition of the complex at a temperature of 250° C. The layer on the right (FIG. 3C) shows a layer containing platinum in metallic form, obtained by means of coating a substrate (polyimide) with a composition containing the PtE complex in a mixture of PnP and ethanol (1:1) and subsequent thermal decomposition of the complex at a temperature of 220° C.

Figure 4A:
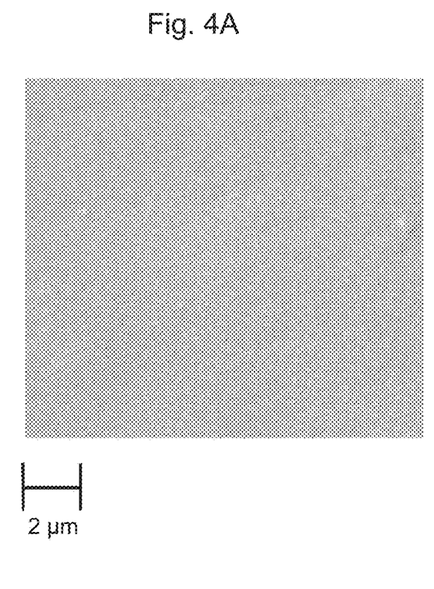
Figure 4B:
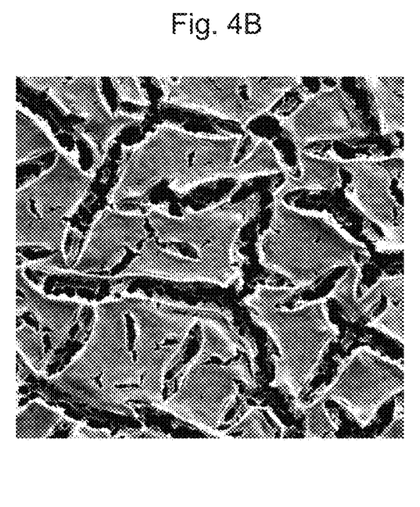

FIG. 4 shows SEM images of monolayers that differ from one another in terms of their morphology. The layer on the left (FIG. 4A) shows a layer containing platinum in metallic form, obtained by means of coating a substrate (polyimide)

with a composition containing the PtV complex dissolved in propylene glycol n-propyl ether and subsequent thermal decomposition of the complex at a temperature of 200° C. The layer on the right (FIG. 4B) shows a layer containing platinum in metallic form, obtained by means of coating a substrate (polyimide) with a composition, likewise containing the PtV complex dissolved in dissolved form in propylene glycol n-propyl ether and subsequent thermal decomposition of the complex at a temperature of 200° C., wherein the layer on the right has been applied in a thickness of at least 1 μm and the layer on the left in a thickness of less than 500 μm. The application in a high layer thickness results in cracks in the resulting layer (see FIG. 4B), wherein the number and dimensions of such cracks likewise allow the electrophysiological properties of such a monolayer to be adapted precisely for the intended use.

FIG. 5 shows, in non-scale form, the manner of producing the conductive layers shown in FIG. 1 (FIG. 5A) and in FIG. 2 (FIG. 5B) in the form of an SEM image. The dashed circles in FIGS. 5A and 5B indicate the area from which the SEM image in FIGS. 1 and 2, respectively, was taken.

Test Methods

Determination of Porosity

The pore volume and pore diameter distribution were determined with mercury porosimetry in accordance with ISO 15901-1:2016. The procedure was as follows: Sample mass 30 mg; surface tension of mercury 0.48 N/m; contact angle of mercury 140°; instrument: Porotec Pascal 140 440; measurement method: scanning; start fill pressure 0.0128 MPa; diatometer: powder, small volume; sample preparation: 8 h at 110° C. under vacuum.

Determination of the Specific Surface Unit

The specific surface unit corresponds to the ratio of the outer surface (in $m^2$) of a body to the volume thereof (in $m^3$), wherein the size of the outer surface is determined with nitrogen as adsorbate at 77 K in accordance with the BET theory (multipoint method, ISO 9277:2010).

Determination of Density

To determine density, the amount of deposited noble metal (e.g., platinum) is first determined gravimetrically. Subsequently, the volume of the deposited noble metal body is determined (by microscopy or—for determining the thickness of the layer—by scanning electron microscopy). The actual density thereof is determined from the ratio of the mass and the volume of the deposited noble metal body. In the case of platinum, a theoretical density of 21.45 g/cm$^3$ was assumed, and in the case of palladium, 11.99 g/cm$^3$.

Determination of Conductivity

Conductivity is determined by 4-point measurement in accordance with ASTM F390:2011-00-"Standard Test Method for Sheet Resistance of Thin Metallic Films With a Collinear Four-Probe Array."

EXAMPLES

Production Example 1: Synthesis of the PtE Complex

A solution of 65 mmol of (COD)PtCl$_2$ in 100 ml of dichloromethane was stirred, and a solution of 260 mmol of sodium 2-ethylhexanoate in 500 ml of water was added. The two-phase mixture was emulsified for 24 h at 20° C. by vigorous stirring. The dichloromethane phase turned yellow in the process. The dichloromethane phase was separated, and the solvent was distilled off. The viscous, yellow residue was absorbed into 150 ml petroleum benzine (40-60), and the solution was dried with magnesium sulfate and filtered. The petroleum benzine was then completely distilled off. A viscous yellow residue of (COD)Pt[O(CO)CH(C$_2$H$_5$)C$_4$H$_9$]$_2$ remained.

To produce the compositions used in the method according to the invention, containing the PtE complex dissolved in an organic solvent, the residue obtained above is dissolved in the desired concentration in the respective solvent, optionally together with further additives.

Production Example 2: Synthesis of the PtV Complex

A solution of 65 mmol (COD)PtCl$_2$ in 100 ml dichloromethane was stirred, and a solution of 260 mmol sodium10-isodecanoate in 500 ml water was added. The two-phase mixture was emulsified for 24 h at 20° C. by vigorous stirring. The dichloromethane phase turned yellow in the process. The dichloromethane phase was separated, and the solvent was distilled off. The viscous, yellow residue was absorbed into 150 ml petroleum benzine (40-60), and the solution was dried with magnesium sulfate and filtered. The petroleum benzine was then completely distilled off. A viscous yellow residue of (COD)Pt[O(CO)C(CH$_3$)$_2$C$_6$H$_{13}$]$_2$ remained.

To produce the compositions used in the method according to the invention, containing the PtE complex dissolved in an organic solvent, the residue obtained above is dissolved in the desired concentration in the respective solvent, optionally together with further additives.

Example 1 (Production of a Layered Body with Two Layers According to the Invention)

A layered body according to the invention comprising two layers containing platinum in metallic form, which differ from one another in terms of their density and porosity, is produced. For this purpose, parallel lines are first applied to a substrate (Kapton 300 HN polyamide film) by means of inkjet printing from a composition containing the PtE complex dissolved in a mixture of PnP and ethanol (1:1) in such an amount that the composition contains 10% by weight of platinum, and the platinum complex is thermally decomposed by heating the substrate to a temperature of 220° C. Thus, as the first layer, lines containing platinum in metallic form and running parallel to one another are obtained at a distance of 6 mm, a width of 3 mm and a length of 50 mm. Parallel lines are then applied to this layer, offset by 90°, by means of inkjet printing from a composition containing the PtV complex dissolved in PnP in such an amount that the composition contains 10% by weight of platinum, and the platinum complex is thermally decomposed by heating the substrate to a temperature of 200° C. In the process, lines containing platinum in metallic form and running parallel to one another are obtained as a second layer at a distance of 5 mm, a width of 1 mm and a length of 25 mm (see FIG. 5A).

Example 2 (Production of a Layered Body with Three Layers According to the Invention)

A layered body according to the invention comprising three layers containing platinum in metallic form, which also differ from one another in terms of their density and porosity, is produced. For this purpose, parallel lines are first applied to a substrate (Kapton 300 HN polyamide film) by means of inkjet printing from a composition containing the PtE complex dissolved in a mixture of PnP and ethanol (1:1) in such an amount that the composition contains 10% by weight of platinum, and the platinum complex is thermally decomposed by heating the substrate to a temperature of 220° C. Thus, as the first layer, lines containing platinum in metallic form and running parallel to one another are obtained at a distance of 6 mm, a width of 3 mm and a length of 50 mm. Parallel lines are then applied to this first layer, offset by 90°, by means of inkjet printing from a composition containing the PtV complex dissolved in PnP in such an amount that the composition contains 10% by weight of platinum, and the platinum complex is thermally decomposed by heating the substrate to a temperature of 200° C. Thus, as a second layer, lines containing platinum in metallic form and running parallel to one another are obtained at a distance of 5 mm, a width of 1 mm and a length of 25 mm. Parallel lines are then applied to this second layer, again offset by 90° (and thus parallel to the lines of the first layer), by means of inkjet printing from a composition containing the PtE complex dissolved in a mixture of PnP and ethanol (1:1) in such an amount that the composition contains 10% by weight of platinum, and the platinum complex is thermally decomposed by heating the substrate to a temperature of 220° C. Thus, as a third layer, lines containing platinum in metallic form and running parallel to one another are obtained at a distance of 6 mm, a width of 3 mm and a length of 50 mm (see FIG. 5B).

Example 3 (Production of Monolayers According to the Invention)

A first layer is obtained by means of inkjet coating of a substrate (Kapton 300 HN polyamide film) with a composition containing the PtV complex dissolved in PnP in such an amount that the composition contains 10% by weight of platinum, and subsequent thermal decomposition of the complex at a temperature of 200° C. The second layer is also obtained by means of inkjet coating of a substrate (Kapton 300 HN polyamide film) with a composition also containing the PtV complex, but now dissolved in dissolved form in a mixture (1:1) of PnP and ethanol in such an amount that the composition contains 10% by weight of platinum, and subsequent thermal decomposition of the complex at a temperature of 250° C. The third layer is obtained by means of inkjet coating of a substrate (Kapton 300 HN polyamide film) with a composition containing the PtE complex dissolved in a mixture of PnP and ethanol (1:1) in such an amount that the composition contains 10% by weight of platinum, and subsequent thermal decomposition of the complex at a temperature of 220° C. (see FIGS. 3A, 3B and 3C).

Example 4 (Production of Monolayers According to the Invention)

A first layer is obtained by means of inkjet coating of a substrate (Kapton 300 HN polyamide film) with a composition containing the PtV complex dissolved in PnP in such an amount that the composition contains 10% by weight of platinum, and subsequent thermal decomposition of the complex at a temperature of 200° C. The second layer is likewise obtained by means of inkjet coating of a substrate (Kapton 300 HN polyamide film) with a composition containing the PtV complex dissolved in dissolved PnP in such an amount that the composition contains 10% by weight of platinum, and subsequent thermal decomposition of the complex at a temperature of 200° C., wherein, however, the second layer has been applied in a significantly higher thickness compared to the first layer (see FIGS. 4A and 4B).

What is claimed is:

1. A method for producing a layered body, comprising the method steps of
   I) providing
      IA) a first composition Z1 comprising
         an organic solvent OL1;
         at least one organic noble metal complex compound EKV1 dissolved or dispersed in the organic solvent OL1 at the concentration K1;
      and
      IB) a second composition Z2 comprising
         an organic solvent OL2;
         at least one organic noble metal complex compound EKV2 dissolved or dispersed in the organic solvent OL2 at the concentration K2;
   II) coating at least a part of the surface of a substrate with the first composition Z1 and heating the coated substrate at a temperature T1 to obtain a first layer S1 containing a noble metal in metallic form and having a thickness D1;
   III) coating at least a part of the first layer S1 containing a noble metal with the second composition Z2 and heating the coated substrate at a temperature T2 to obtain a second layer S2 containing a noble metal in metallic form and having a thickness D2, which second layer at least partially covers the first layer S1 containing a noble metal;
   wherein the organic noble metal complex compounds EKV1 and EKV2, the organic solvents OL1 and OL2, the concentrations K1 and K2, the thicknesses D1 and D2 and the temperatures T1 and T2 are selected or adapted in such a manner that the first and the second layer S1 and S2 containing a noble metal differ from one another in at least one of the following properties:
   (α) electrical conductivity;
   (β) porosity;
   (γ) density;
   (δ) specific surface unit.

2. The method according to claim 1, wherein the organic solvents OL1 and OL2, each independently of one another, are selected from the group consisting of propylene glycol n-propyl ether, ethanol or a mixture thereof.

3. The method according to claim 1, wherein the organic noble metal complex compounds EKV1 and EKV2, independently of one another, comprise platinum complexes of the type $[L1L2Pt[O(CO)R^1]X]_n$,
   wherein L1 and L2 represent the same or different monoolefin ligands or together represent a compound L1L2 acting as a diolefin ligand,
   wherein X is selected from bromide, chloride, iodide and —O(CO)R$^2$,
   wherein —O(CO)R$^1$ and —O(CO)R$^2$ represent the same or different non-aromatic C8-C18 monocarboxylic acid groups or together represent a non-aromatic C8-C18 dicarboxylic acid group —O(CO)R$^1$R$^2$(CO)O—,
   wherein said platinum complexes are mononuclear platinum complexes with n=1, or wherein, in the event of the presence of L1L2 and/or —O(CO)R1R2(CO)O—, may be polynuclear platinum complexes with a whole number n>1.

4. The method according to claim 3, wherein the organic noble metal complex compounds EKV1 and EKV2, independently of one another, are platinum complexes of the formula $[(L1L2)Pt[O(CO)R^1]_2]_n$, wherein n is equal to 1 or 2, L1L2 is cyclooctadiene or norbornadiene, and wherein R$^1$ is a non-aromatic C7-C17 hydrocarbon group.

5. The method according to claim 3, wherein the organic noble metal complex compounds EKV1 and EKV2, independently of one another, are platinum complexes selected from the group consisting of the complexes (COD)Pt[O(CO)CH($C_2H_5$)$C_4H_9$]$_2$, (COD)Pt[O(CO)C($CH_3$)$_2$$C_6H_{13}$]$_2$ and a mixture thereof.

6. The method according to claim 1, wherein K1 and K2, independently of one another, are within a range from 5 to 75% by weight, based on the total weight of the first composition Z1 and the second composition Z2, respectively.

7. The method according to claim 1, wherein T1 and T2, independently of one another, are within a range from 125 to 350° C.

8. The method according to claim 1, wherein D1 and D2, independently of one another, are within a range from 20 nm to 5 μm.

9. The method according to claim 1, wherein the substrate comprises one or more materials selected from the group consisting of glass, ceramic, metal, plastics, modified or non-modified polymers of natural origin, cardboard, and paper.

10. The method according to claim 1, wherein the first composition Z1, the second composition Z2 or both compositions include an additive selected from the group consisting of wetting additives, rheology additives, defoamers, deaerators, additives for influencing surface tension, and odorants.

\* \* \* \* \*